United States Patent
Walley, Jr.

(10) Patent No.: US 11,501,664 B2
(45) Date of Patent: Nov. 15, 2022

(54) COLOR CODING SYSTEM FOR PVC PIPES AND COUPLINGS

(71) Applicant: James W. Walley, Jr., Weatherford, TX (US)

(72) Inventor: James W. Walley, Jr., Weatherford, TX (US)

(*) Notice: Subject to any disclaimer, the term of this patent is extended or adjusted under 35 U.S.C. 154(b) by 0 days.

(21) Appl. No.: 17/240,161

(22) Filed: Apr. 26, 2021

(65) Prior Publication Data

US 2021/0248929 A1 Aug. 12, 2021

Related U.S. Application Data

(63) Continuation of application No. 16/102,382, filed on Aug. 13, 2018, now Pat. No. 10,991,273, which is a continuation of application No. 15/279,016, filed on Sep. 28, 2016, now Pat. No. 10,078,974, which is a continuation-in-part of application No. 14/266,948, filed on May 1, 2014, now abandoned.

(51) Int. Cl.
| | | |
|---|---|---|
| *G09F 3/02* | (2006.01) | |
| *G09F 3/00* | (2006.01) | |
| *F16L 55/00* | (2006.01) | |
| *E03C 1/00* | (2006.01) | |

(52) U.S. Cl.
CPC .............. *G09F 3/0295* (2013.01); *E03C 1/00* (2013.01); *F16L 55/00* (2013.01); *F16L 2201/10* (2013.01); *F16L 2201/60* (2013.01); *G09F 2003/0208* (2013.01)

(58) Field of Classification Search
CPC . G09F 3/0295; F16L 2201/10; F16L 2201/60; F16L 35/00
See application file for complete search history.

(56) References Cited

U.S. PATENT DOCUMENTS

| | | | |
|---|---|---|---|
| 3,170,667 A | | 2/1965 | Szohatzky |
| 3,418,739 A | * | 12/1968 | Buczak ..................... G09F 3/00 40/308 |
| 4,696,326 A | | 9/1987 | Sturgis |
| 5,280,967 A | | 1/1994 | Varrin, Jr. |
| 5,653,264 A | | 8/1997 | Atkinson |
| 5,773,111 A | | 6/1998 | Brewster |
| 6,082,627 A | * | 7/2000 | Raterman ............... B05B 15/00 239/71 |
| 6,311,637 B1 | * | 11/2001 | Moss ........................ G09F 3/10 116/200 |

(Continued)

OTHER PUBLICATIONS

Office Action dated Oct. 24, 2014 from U.S. Appl. No. 14/266,948.

(Continued)

*Primary Examiner* — Gary C Hoge
(74) *Attorney, Agent, or Firm* — James E. Walton

(57) ABSTRACT

A system of visual and non-visual marks for pipes and couplings which allows users to group the pipes and couplings by type, size, end configurations and composition with a series of symbols, including colors, shapes, swirls, patterns. The symbols are applied to the pipes and couplings by printing, etching, painting, applying stickers, and or molding. The non-visual mark utilize the magnetic and radio reflective nature of the marks to allow remote identification of the plumbing pipes and couplings after being buried.

16 Claims, 10 Drawing Sheets

(56) References Cited

U.S. PATENT DOCUMENTS

| | | | |
|---|---|---|---|
| 8,430,431 B2 | 4/2013 | Schindel | |
| 8,689,836 B2 | 4/2014 | Hudson | |
| 8,985,156 B2 | 3/2015 | Drouin et al. | |
| 9,750,964 B2* | 9/2017 | Richardson | A62C 33/00 |
| 2001/0040374 A1* | 11/2001 | Breihan | E21B 17/00 |
| | | | 285/93 |
| 2004/0217586 A1* | 11/2004 | Mastropaolo | F16L 35/00 |
| | | | 285/914 |
| 2004/0222626 A1* | 11/2004 | Baruh | F16L 21/002 |
| | | | 285/31 |
| 2008/0164338 A1 | 7/2008 | Burns | |
| 2008/0174107 A1 | 7/2008 | Jordan | |
| 2009/0267345 A1* | 10/2009 | Choi | F16L 37/0927 |
| | | | 285/309 |
| 2010/0289647 A1 | 11/2010 | Rudduck et al. | |
| 2011/0175343 A1 | 7/2011 | Akins | |
| 2011/0233922 A1* | 9/2011 | Schindel | F16L 37/28 |
| | | | 285/33 |
| 2011/0258896 A1 | 10/2011 | Watson et al. | |
| 2012/0211974 A1* | 8/2012 | Richardson | A62C 33/00 |
| | | | 285/93 |
| 2013/0321131 A1 | 12/2013 | Tucker et al. | |
| 2014/0000138 A1 | 1/2014 | Cable | |
| 2014/0326507 A1* | 11/2014 | Spriggs | E21B 17/006 |
| | | | 175/40 |
| 2015/0213736 A1* | 7/2015 | Larsen | G09F 3/0295 |
| | | | 29/428 |
| 2017/0306705 A1 | 10/2017 | Drevdal et al. | |
| 2019/0285222 A1* | 9/2019 | Musick | F16L 59/022 |

OTHER PUBLICATIONS

Amendment dated Jan. 26, 2015 from U.S. Appl. No. 14/266,948.
Final Office Action dated Apr. 17, 2015 from U.S. Appl. No. 14/266,948.
Amendment After Final dated Jun. 17, 2015 from U.S. Appl. No. 14/266,948.
Office Action dated Sep. 11, 2015 from U.S. Appl. No. 14/266,948.
Amendment dated Dec. 11, 2015 from U.S. Appl. No. 14/266,948.
Final Office Action dated Mar. 28, 2016 from U.S. Appl. No. 14/266,948.
Amendment After Final dated May 31, 2016 from U.S. Appl. No. 14/266,948.
Abandonment dated Oct. 27, 2016 from U.S. Appl. No. 14/266,948.
Restriction Requirement dated Jul. 24, 2017 from U.S. Appl. No. 15/279,016.
Response to Restriction Requirement dated Sep. 25, 2017 from U.S. Appl. No. 15/279,016.
Office Action dated Nov. 3, 2017 from U.S. Appl. No. 15/279,016.
Amendment dated Feb. 5, 2018 from U.S. Appl. No. 15/279,016.
Final Office Action dated Apr. 13, 2018 from U.S. Appl. No. 15/279,016.
Amendment After Final dated Jun. 13, 2018 from U.S. Appl. No. 15/279,016.
Notice of Allowance dated Jul. 26, 2018 from U.S. Appl. No. 15/279,016.
Restriction Requirement dated Aug. 26, 2019 from U.S. Appl. No. 16/102,382.
Response to Restriction Requirement dated Sep. 17, 2019 from U.S. Appl. No. 16/102,382.
Office Action dated Sep. 30, 2019 from U.S. Appl. No. 16/102,382.
Amendment dated Dec. 12, 2019 from U.S. Appl. No. 16/102,382.
Final Office Action dated Mar. 18, 2020 from U.S. Appl. No. 16/102,382.
Amendment After Final dated Apr. 22, 2020 from U.S. Appl. No. 16/102,382.
Office Action dated Sep. 1, 2020 from U.S. Appl. No. 16/102,382.
Amendment dated Dec. 1, 2020 from U.S. Appl. No. 16/102,382.
Notice of Allowance dated Feb. 3, 2021 from U.S. Appl. No. 16/102,382.
Corrected Notice of Allowance dated Feb. 23, 2021 from U.S. Appl. No. 16/102,382.

* cited by examiner

COLOR CODING SYSTEM FOR PVC PIPES AND COUPLINGS

This application is a continuation of U.S. patent application Ser. No. 16/102,382 filed 13 Aug. 2018, titled "Color Coding System for PVC Pipes and Couplings," which is a continuation of U.S. patent application Ser. No. 15/279,016 filed 28 Sep. 2016, titled "Color Coding System for PVC Pipes and Couplings," which issued under U.S. Pat. No. 10,078,974 on 18 Sep. 2018, which is a continuation-in part of U.S. patent application Ser. No. 14/266,948 filed 1 May 2014, titled "Color Coding System for PVC Pipes and Couplings," which is abandoned.

BACKGROUND

1. Field of the Invention

The present invention relates in general to the field of poly-vinyl chloride "PVC" pipes and couplings and the ability of users to quickly determine the type of PVC pipes and PVC couplings from a glance without using tools to measure the diameters of the PVC pipes and PVC couplings.

2. Description of Related Art

Pipes and couplings for pipes are typically not marked in a way that plumbers and users can readily glance at the fittings and the pipes to determine the size, composition, and configuration of the fittings and pipes used. Some pipes are color coded as to their composition or schedule. Some example include: coppered colored copper pipe; grey schedule 80 PVC; black acylonitrile-butadiene-styrene "ABS" pipe; and light blue polybutylene "PB" pipes. While having pipes color coded as to composition helps users determine the composition, there is no easy way for users of pipes to quickly and easily select proper fittings from merely looking at the pipes and fittings.

When a user is ready to assembly a pipe to a fitting they select the pipe based upon the requirements of the installation and then select the fittings to attach the pipe as needed. To insure that the selected fittings are the proper fittings and matched to the selected pipe, the fittings must be measured and compared to the measurements of the pipe. Alternatively, the user test fits the fittings on the pipes to check the fit. If the needed fitting is in a bin with other non-needed fittings then the user must repeated measure or check to find the right fitting in the bin of fittings, thereby wasting time. Currently some manufacturers color the packaging the plumbing fixtures are shipped in based on size. However, color coding packing does not help the user when the plumbing fixture is removed from the package.

Referring to FIG. 1 in the drawings, a prior art embodiment of a PVC pipe and PVC coupling according to the present application is illustrated. Plumbing system 101 is a depiction of a typical installation of PVC pipes and PVC fittings. Plumbing system 101 includes a first pipe 111, a second pipe 115, a third pipe 121, a forth pipe 125, and a fifth pipe 131. Connecting first pipe 111 to second pipe 115 is a reducing tee 135 coupled to fifth pipe 131. Connecting second pipe 115 to third pipe 121 is an elbow 141. Connecting third pipe 121 to forth pipe 125 is a reducer 145. A plumber cannot visually look at system 101 and verify that the proper sized fittings were used. This forces the plumber to measure each fitting to check compliance. Furthermore, an inspector trying to validate the work the plumber's completed cannot readily check the size of the fittings because they are glued together. The inspector could measure the outside of the fittings and compare the outer diameter to the expected outer diameter, however that method is labor intensive and potentially unreliable due to the variance in fitting construction. While there are many ways to mark plumbing fixtures well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
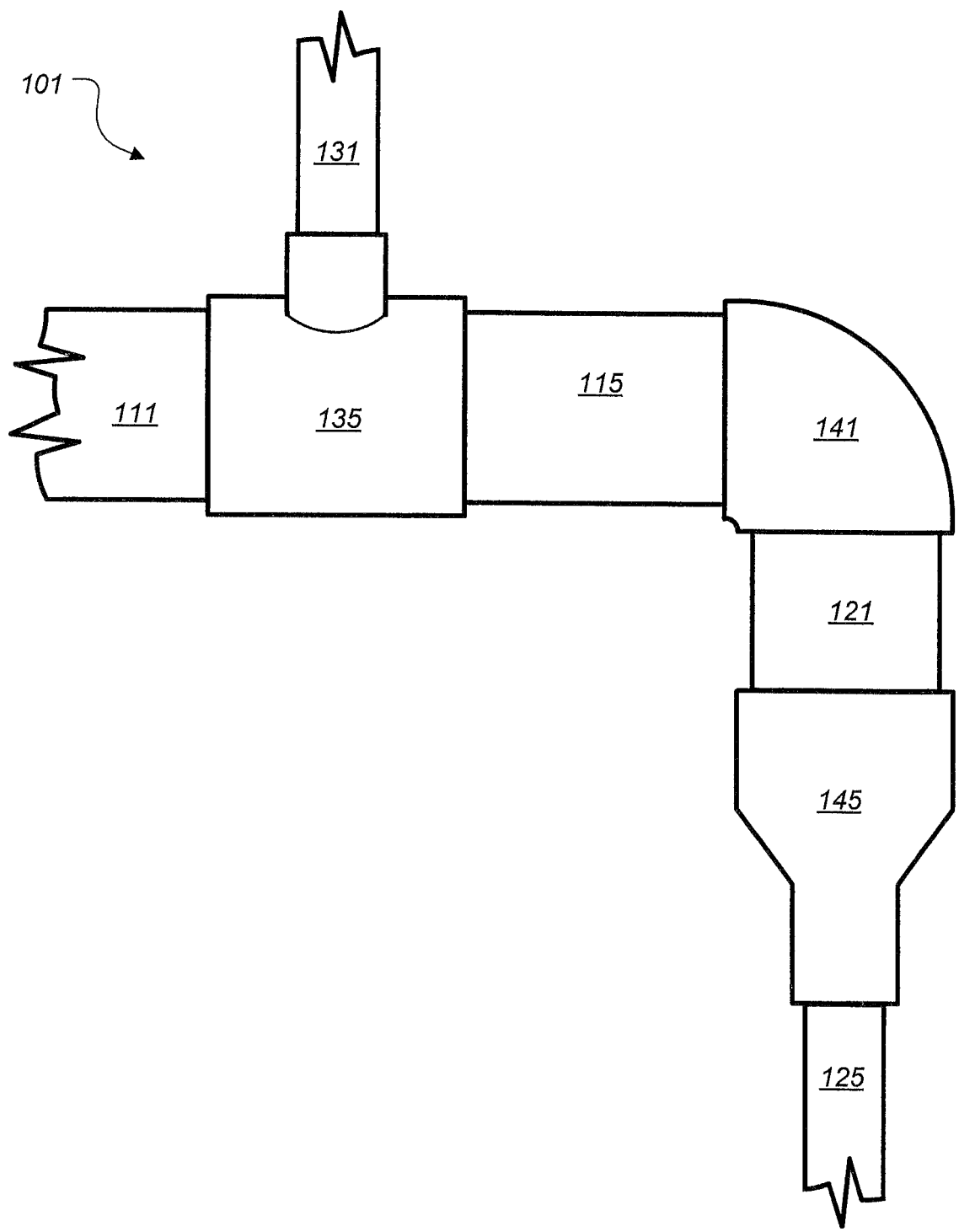
FIG. 1 is a plan view of PVC pipes and couplings according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of color coding PVC pipes and couplings are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A color coding system for PVC pipes and couplings which allows users to group plumbing articles by type, size, and composition with a series of colors, shapes, swirls, patterns. The series of colors, shapes, swirls, patterns are applied to the plumbing articles by etching, painting, applying stickers, molding, anodizing, plating, texturing, and or embedding materials into the plumbing articles themselves. Preferably the series of colors, shapes, swirls, and patterns are incorporated into the plumbing articles such that they are irreplaceable and non-removable. Non-removable marks prevent the marking system from being changed from one installation to another. Non-removable marks may be sealed with a layer of clear-coat, a transparent layer of plastic, or other elements to increase non-removability of the mark. Therefore, users in a decade can rely on the certain pattern being a certain way and not changed by the installer. Plumbing articles as contemplated by this application include but are not limited to; pipes; fittings; couplings; reducers; tees; elbows; tubing; and adapters. Preferably the plumbing articles are fabricated from PVC, however alternative embodiments are fabricated from rubber, copper, plastic, aluminum, or steel.

Pipes are fabricated in various sizes such as: ⅛"; ¼"; ⅜'; ½"; ¾"; 1"; 1¼"; 1½"; 2"; 2½"; 3" . . . . Fittings or couplings are fabricated in various sizes to properly couple together pipes. The size of the couplings are determined by the size of the pipes to be coupled. This application contemplates selecting a color for each size of pipe. For example 1" pipe would be assigned a blue color and a 1¼" pipe would be assigned a green color. Fittings suitable for 1" pipe would also be assigned the same blue color and fittings for 1¼" pipes assigned the same green color. Coloring the fittings to the pipes helps users select and check the proper fittings to the pipes are used.

Figure 2:
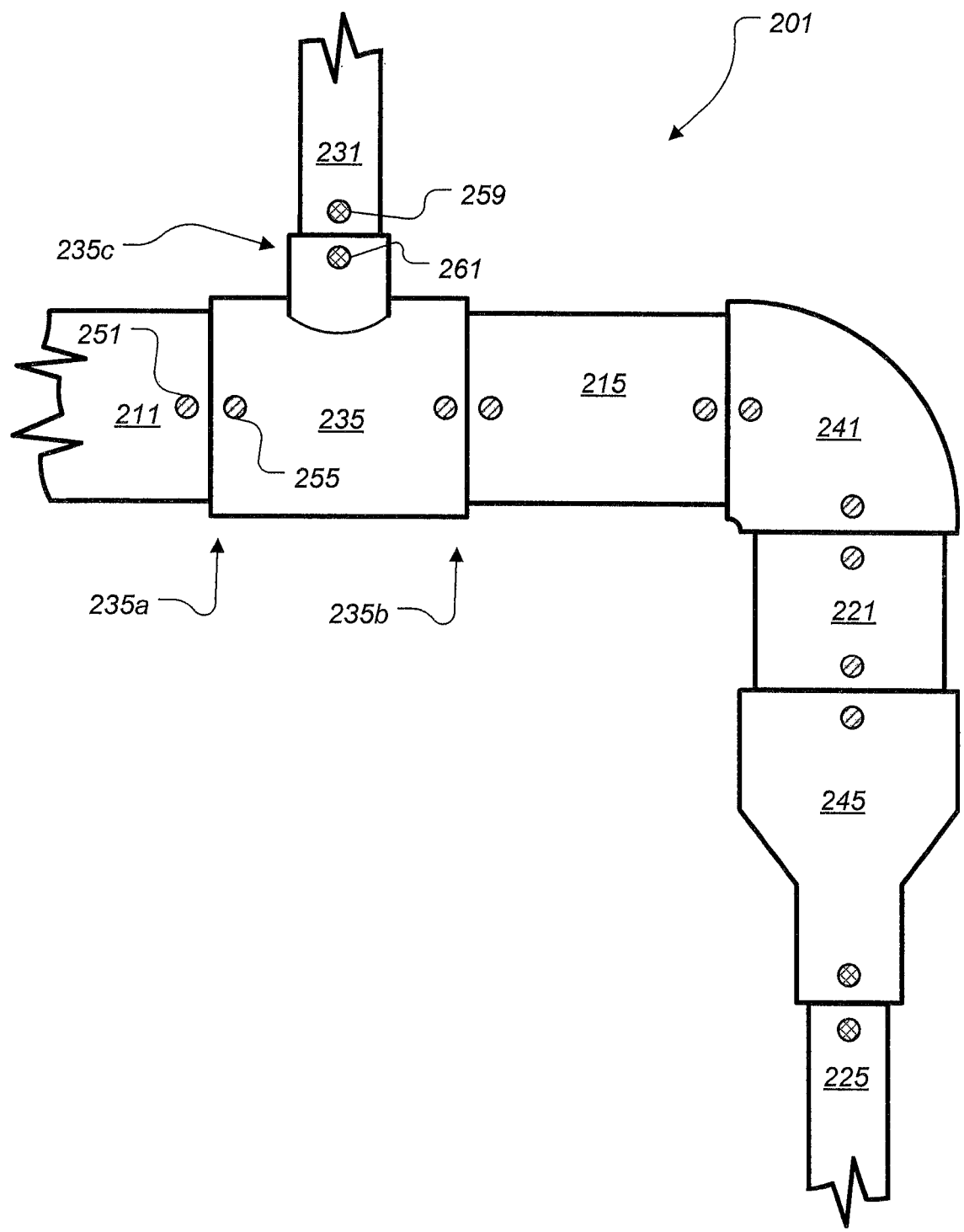
FIG. 2 is a plan view of an embodiment of a color coding system for PVC pipes and couplings according to the present application.

Referring now also to FIG. 2 in the drawings, an embodiment of a color coding system for PVC pipes and couplings according to the present application is illustrated. Plumbing system 201 is a depiction of an improved installation of PVC pipes and PVC fittings. Plumbing system 201 includes a first pipe 211, a second pipe 215, a third pipe 221, a forth pipe 225, and a fifth pipe 231. Connecting first pipe 211 to second pipe 215 is a reducing tee 235 also coupled to fifth pipe 231. Reducing tee 235 has three ports: first port 235*a*, second port 235*b*, and third port 235*c*. First port 235*a* and 235*b* have the same diameter, while port 235*c* has a reduced diameter compared to 235*a* or 235*b*. Connecting second pipe 215 to third pipe 221 is an elbow 241. Connecting third pipe 221 to forth pipe 225 is a reducer 245. A plumber or user can visually look at system 201 and verify that the proper sized fittings were used. What allows a user to visually look at system 201 and be able to verify the proper sized fittings in relation to pipes were used are the color codes on the pipes and fittings.

First mark 251 is located a set distance from the end of the first pipe 211 such that the first mark 251 remains visible while coupled to the adjacent reducing tee 235. Second mark 255 is located a set distance away from the end of reducing tee 235. Because first pipe 211 and the reducing tee 235 are properly sized to couple together first mark 251 is identical in color to second mark 255. The applicant used similar hatching in first mark 251 and second mark 255 to indicate that the color is the same. The hatching does not indicate a difference in materials just a change in color.

Third mark 259 is located a set distance from the end of the fifth pipe 231 such that the third mark 259 remains visible while coupled to the adjacent reducing tee 235. Forth mark 261 is located a set distance away from the end of reducing tee 235. Because fifth pipe 231 and the reducing tee 235 are properly sized to couple together third mark 259 is identical in color to forth mark 261. The applicant used similar hatching in third mark 259 and forth mark 261 to indicate that the color is the same. The hatching does not indicate a difference in materials just a change in color. It should be apparent that the color of first mark 251 is different than forth mark 261 to indicate the difference in diameter between the coupling and the pipe.

Figure 3:
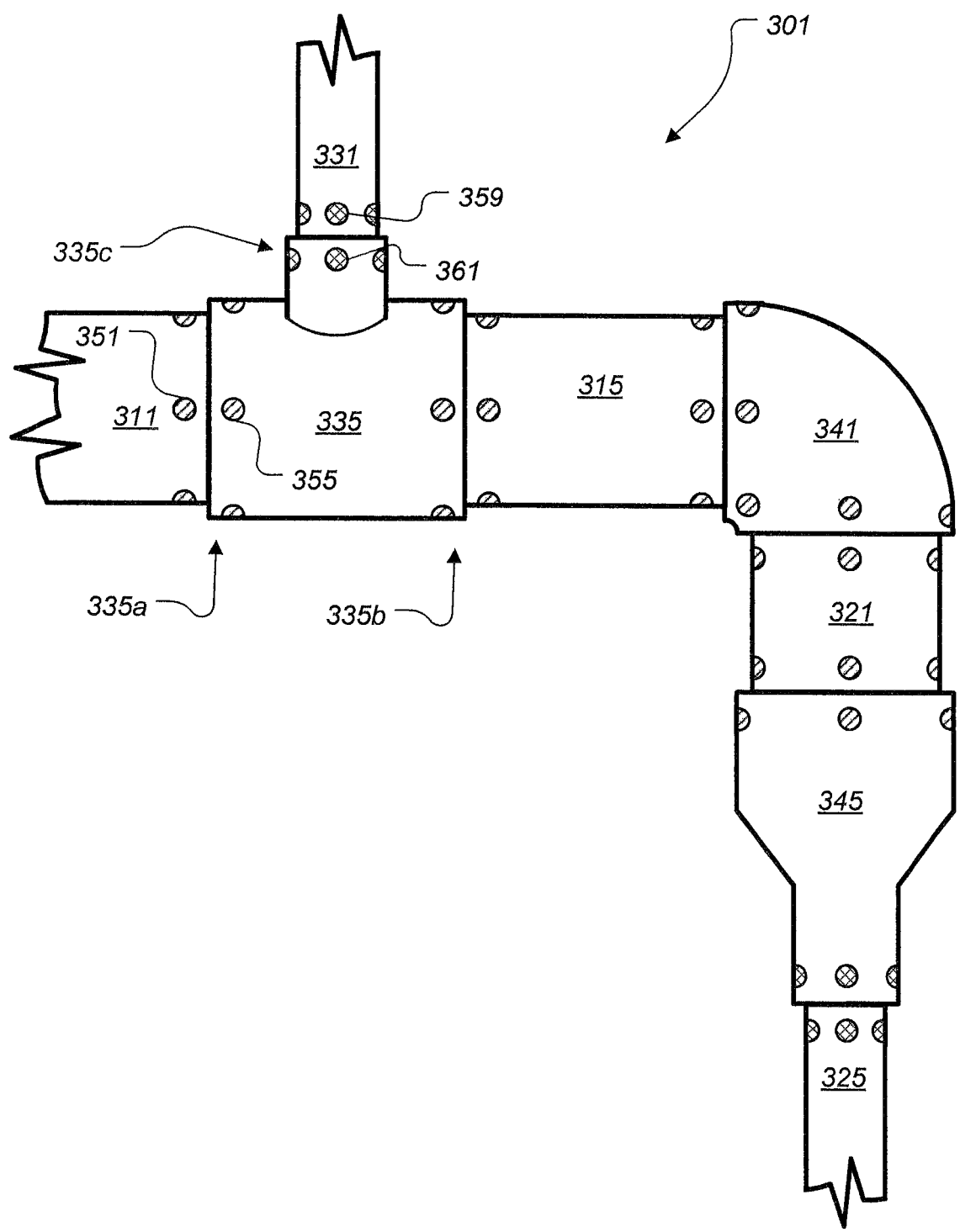
FIG. 3 is a plan view of an embodiment of a color coding system for PVC pipes and couplings according to the present application.

Referring now also to FIG. 3 in the drawings, an embodiment of a color coding system for PVC pipes and couplings according to the present application is illustrated. Plumbing system 301 is a depiction of an improved installation of PVC pipes and PVC fittings. Plumbing system 301 includes a first pipe 311, a second pipe 315, a third pipe 321, a forth pipe 325, and a fifth pipe 331. Connecting first pipe 311 to second pipe 315 is a reducing tee 335 also coupled to fifth pipe 331. Reducing tee 335 has three ports: first port 335*a*, second port 335*b*, and third port 335*c*. First port 335*a* and 335*b* have the same diameter, while port 335*c* has a reduced diameter compared to 335*a* or 335*b*. Connecting second pipe 315 to third pipe 321 is an elbow 341. Connecting third pipe 321 to forth pipe 325 is a reducer 345. A plumber or user can visually look at system 301 and verify that the proper sized fittings were used. What allows a user to visually look at system 301 and be able to verify the proper sized fittings in relation to pipes were used are the color codes on the pipes and fittings.

First mark 351 is located a set distance from the end of the first pipe 311 such that the first mark 351 remains visible while coupled to the adjacent reducing tee 335. Second mark 355 is located a set distance away from the end of reducing tee 335. Because first pipe 311 and the reducing tee 335 are properly sized to couple together first mark 351 is identical in color to second mark 355. The applicant used similar hatching in first mark 351 and second mark 355 to indicate that the color is the same. The hatching does not indicate a difference in materials just a change in color.

Third mark 359 is located a set distance from the end of the fifth pipe 331 such that the third mark 359 remains visible while coupled to the adjacent reducing tee 335. Forth mark 361 is located a set distance away from the end of reducing tee 335. Because fifth pipe 331 and the reducing tee 335 are properly sized to couple together third mark 359 is identical in color to forth mark 361. The applicant used similar hatching in third mark 359 and forth mark 361 to indicate that the color is the same. The hatching does not indicate a difference in materials just a change in color. It should be apparent that the color of first mark 351 is different than forth mark 361 to indicate the difference in diameter between the coupling and the pipe. It should be apparent that the difference between system 201 and system 301 is that system 301 includes a plurality of mark arrayed around the diameter of the pipes and fittings. Arraying the marks facilitates easy recognition of the pipes and fittings without regards to the relative position of the marks to the user.

Figure 4:
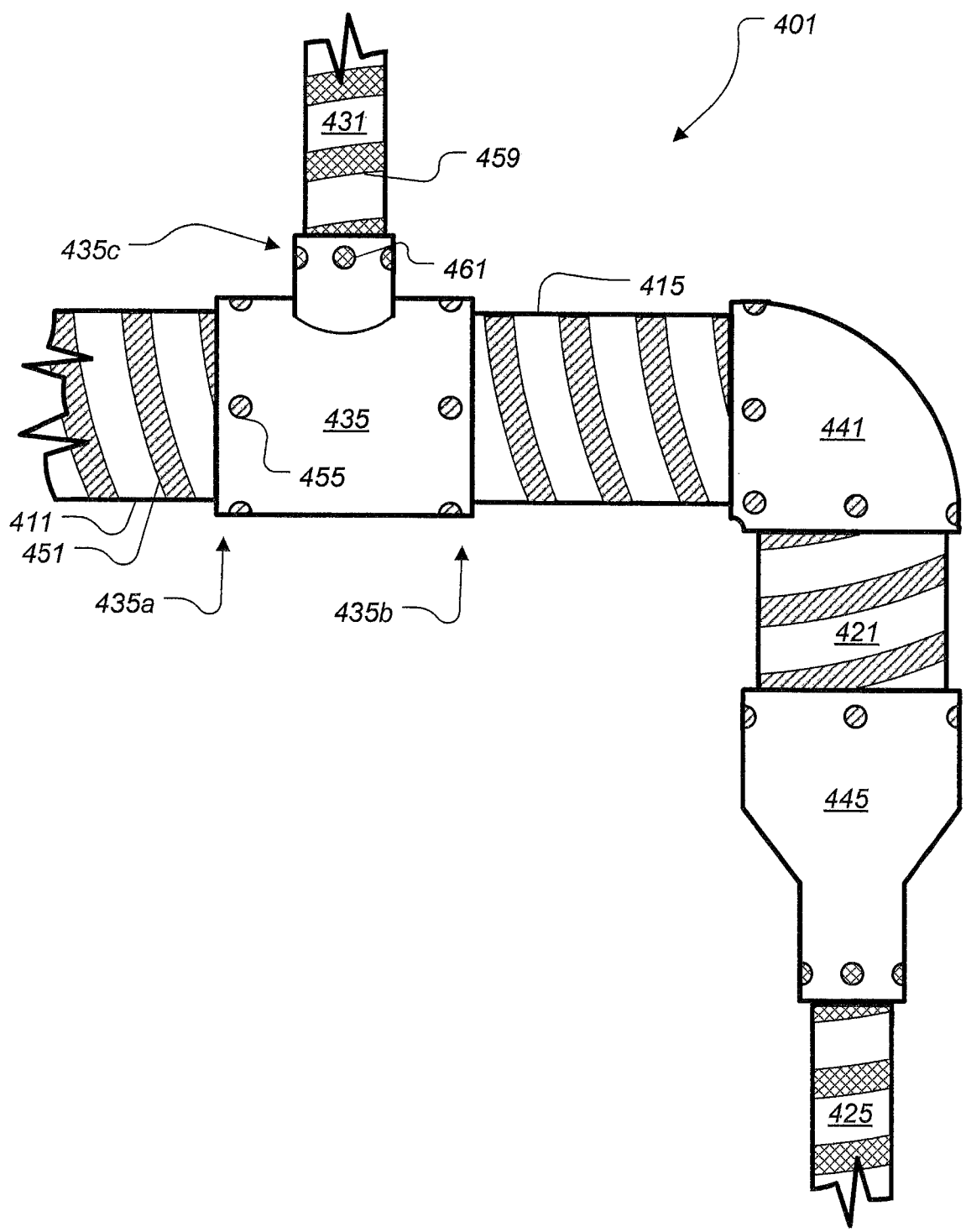
FIG. 4 is a plan view of a preferred embodiment of a color coding system for PVC pipes and couplings according to the present application.

Referring now also to FIG. 4 in the drawings, a preferred embodiment of a color coding system for PVC pipes and couplings according to the present application is illustrated. Plumbing system 401 is a depiction of an improved installation of PVC pipes and PVC fittings. Plumbing system 401 includes a first pipe 411, a second pipe 415, a third pipe 421, a forth pipe 425, and a fifth pipe 431. Connecting first pipe 411 to second pipe 415 is a reducing tee 435 also coupled to fifth pipe 431. Reducing tee 435 has three ports: first port 435*a*, second port 435*b*, and third port 435*c*. First port 435*a* and 435*b* have the same diameter, while port 435*c* has a reduced diameter compared to 435*a* or 435*b*. Connecting second pipe 415 to third pipe 421 is an elbow 441. Connecting third pipe 421 to forth pipe 425 is a reducer 445. A plumber or user can visually look at system 401 and verify that the proper sized fittings were used. What allows a user to visually look at system 401 and be able to verify the proper sized fittings in relation to pipes were used are the color codes on the pipes and fittings.

First mark 451 is located on the first pipe 411 such that the first mark 451 remains visible while coupled to the adjacent reducing tee 435 and is candy striped in a curved or helical pattern down the length of the pipe. Second mark 455 is located a set distance away from the end of reducing tee 435. Because first pipe 411 and the reducing tee 435 are properly sized to couple together first mark 451 is identical in color to second mark 455. The applicant used similar hatching in first mark 451 and second mark 455 to indicate that the color is the same. The hatching does not indicate a difference in materials just a change in color.

Third mark 459 is located on the fifth pipe 431 such that the third mark 459 remains visible while coupled to the adjacent reducing tee 435 and is candy striped in a curved or helical pattern down the length of the pipe. Forth mark 461 is located a set distance away from the end of reducing tee 435. Because fifth pipe 431 and the reducing tee 435 are properly sized to couple together, third mark 459 is identical in color to forth mark 461. The applicant used similar hatching in third mark 459 and forth mark 461 to indicate that the color is the same. The hatching does not indicate a difference in materials just a change in color. It should be apparent that the color of first mark 451 is different than forth mark 461 to indicate the difference in diameter between the coupling and the pipe. It should be apparent that the difference between system 201 and system 401 is that system 401 includes a plurality of marks arrayed around the diameter of the fittings and the spiral stripe down the length of the pipes. Arraying the marks and striping the pipes facilitates easy recognition of the fittings and pipes without regards to the relative position of the marks to the user.

Figure 5:
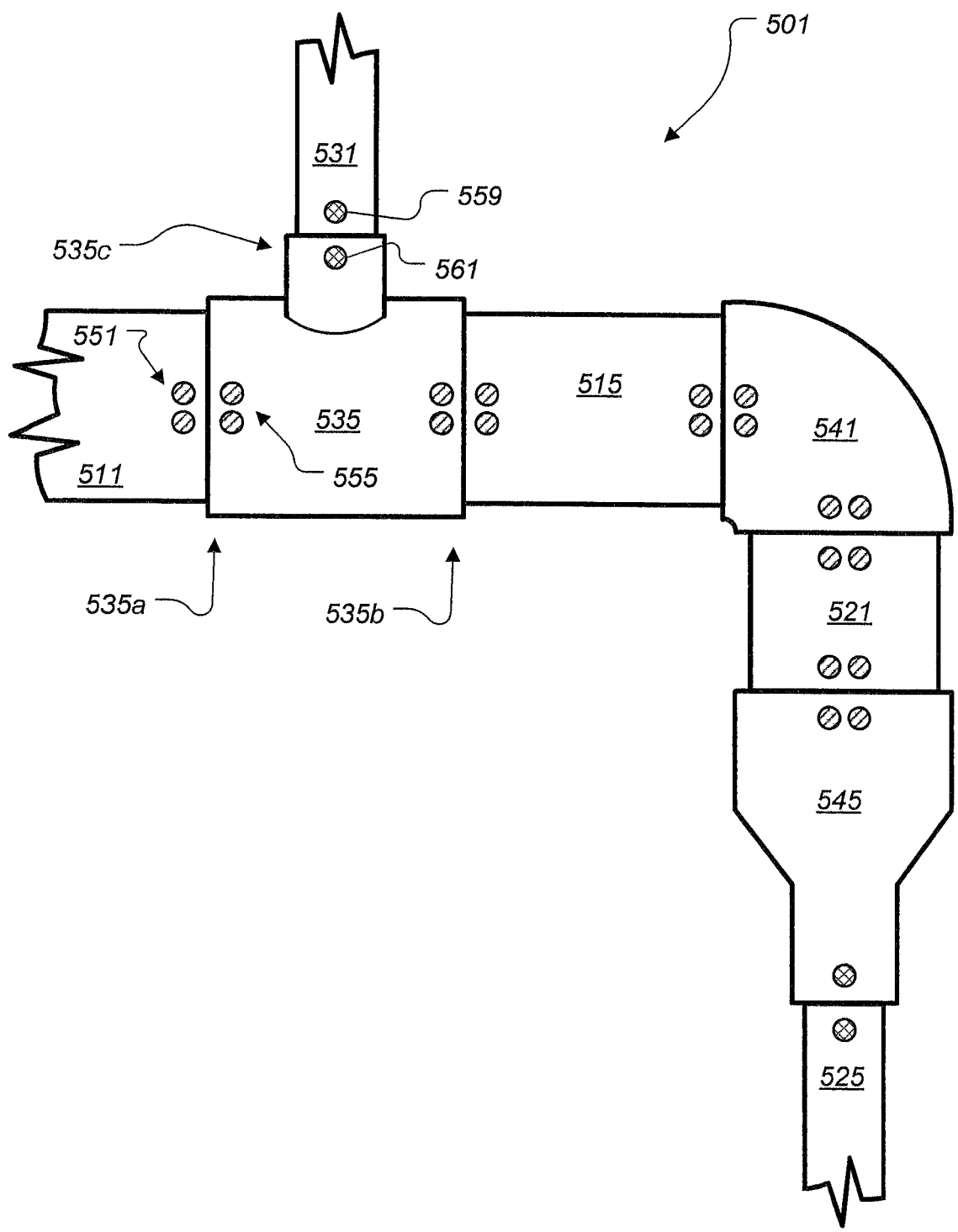
FIG. 5 is a plan view of an embodiment of a color coding system for PVC pipes and couplings according to the present application.

Referring now also to FIG. 5 in the drawings, an embodiment of a color coding system for PVC pipes and couplings according to the present application is illustrated. Plumbing system 501 is a depiction of an improved installation of PVC pipes and PVC fittings. Plumbing system 501 includes a first pipe 511, a second pipe 515, a third pipe 521, a forth pipe 525, and a fifth pipe 531. Connecting first pipe 511 to second pipe 515 is a reducing tee 535 also coupled to fifth pipe 531. Reducing tee 535 has three ports: first port 535*a*, second port 535*b*, and third port 535*c*. First port 535*a* and 535*b* have the same diameter, while port 535*c* has a reduced diameter compared to 535*a* or 535*b*. Connecting second pipe 515 to third pipe 521 is an elbow 541. Connecting third pipe 521 to forth pipe 525 is a reducer 545. A plumber or user can visually look at system 501 and verify that the proper sized fittings were used. What allows a user to visually look at system 501 and be able to verify the proper sized fittings in relation to pipes were used are the color codes on the pipes and fittings.

First mark 551, a pattern of two closely spaced shapes, is located a set distance from the end of the first pipe 511 such that the first mark 551 remains visible while coupled to the adjacent reducing tee 535. Second mark 555, a pattern of two closely shaped shapes, is located a set distance away from the end of reducing tee 535. Because first pipe 511 and the reducing tee 535 are properly sized to couple together first mark 551 is identical in color and pattern to second mark 555. The applicant used similar hatching in first mark 551 and second mark 555 to indicate that the color is the same. The hatching does not indicate a difference in materials just a change in color.

Third mark 559 is located a set distance from the end of the fifth pipe 531 such that the third mark 559 remains visible while coupled to the adjacent reducing tee 535. Forth mark 561 is located a set distance away from the end of reducing tee 535. Because fifth pipe 531 and the reducing tee 535 are properly sized to couple together third mark 559 is identical in color to forth mark 561. The applicant used similar hatching in third mark 559 and forth mark 561 to indicate that the color is the same. The hatching does not indicate a difference in materials just a change in color. It should be apparent that the color and pattern of first mark 551 is different than forth mark 561 to indicate the difference in diameter between the coupling and the pipe. It should be apparent that the difference between system 201 and system 501 is that system 501 includes the addition of patterns to aid is designating differences in PVC in addition to using different colors.

Figure 6:
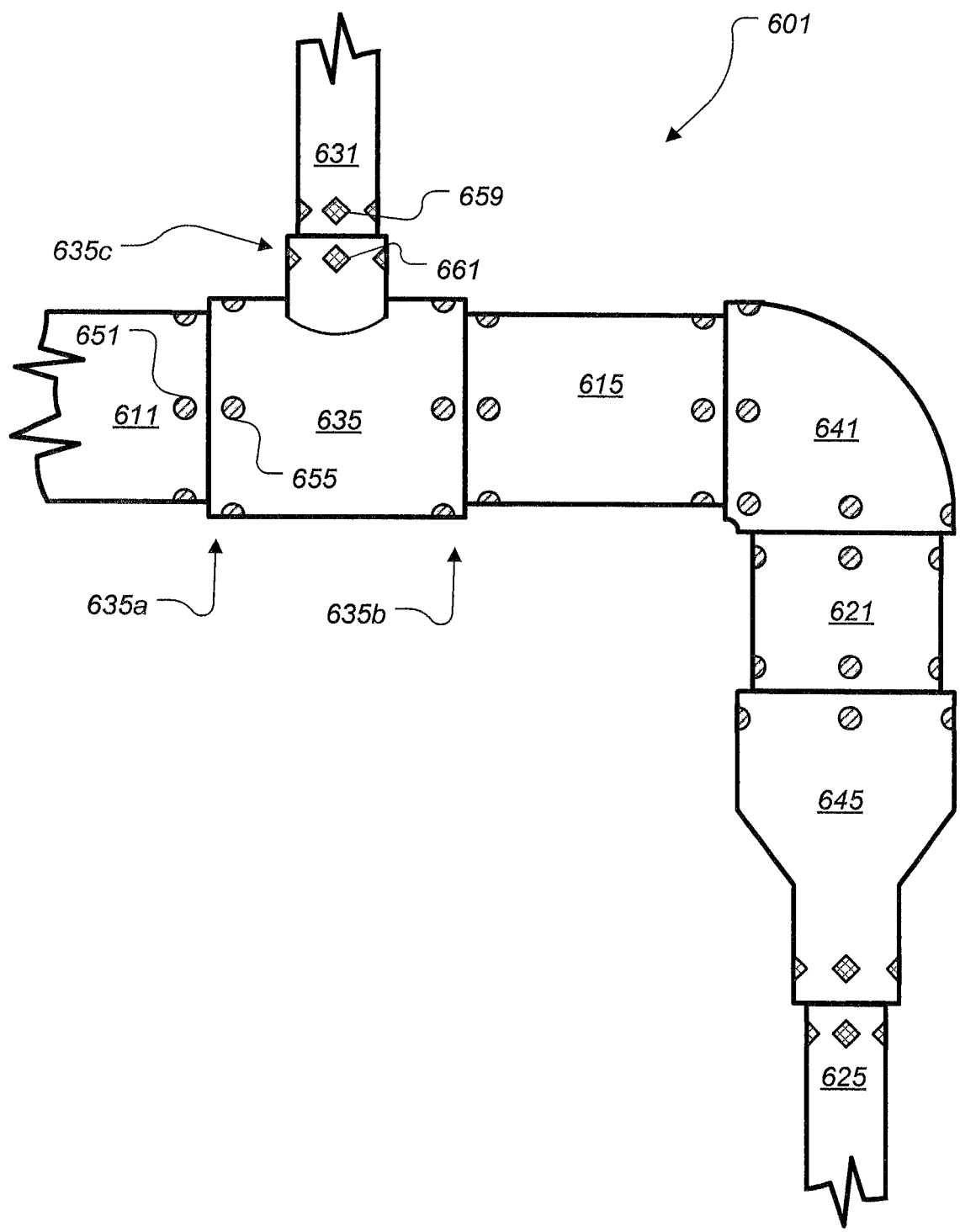
FIG. 6 is a plan view of an embodiment of a color coding system for PVC pipes and couplings according to the present application.

Referring now also to FIG. 6 in the drawings, an embodiment of a color coding system for PVC pipes and couplings according to the present application is illustrated. Plumbing system 601 is a depiction of an improved installation of PVC pipes and PVC fittings. Plumbing system 601 includes a first pipe 611, a second pipe 615, a third pipe 621, a forth pipe 625, and a fifth pipe 631. Connecting first pipe 611 to second pipe 615 is a reducing tee 635 also coupled to fifth pipe 631. Reducing tee 635 has three ports: first port 635*a*, second port 635*b*, and third port 635*c*. First port 635*a* and 635*b* have the same diameter, while port 635*c* has a reduced diameter compared to 635*a* or 635*b*. Connecting second pipe 615 to third pipe 621 is an elbow 641. Connecting third pipe 621 to forth pipe 625 is a reducer 645. A plumber or user can visually look at system 601 and verify that the proper sized fittings were used. What allows a user to visually look at system 601 and be able to verify the proper sized fittings in relation to pipes were used are the color codes on the pipes and fittings.

First mark 651, a circular shape, is located a set distance from the end of the first pipe 611 such that the first mark 651 remains visible while coupled to the adjacent reducing tee 635. Second mark 655, a circular shape, is located a set distance away from the end of reducing tee 635. Because first pipe 611 and the reducing tee 635 are properly sized to couple together first mark 651 is identical in color and pattern to second mark 655. The applicant used similar hatching in first mark 651 and second mark 655 to indicate that the color is the same. The hatching does not indicate a difference in materials just a change in color.

Third mark 659, a diamond shape, is located a set distance from the end of the fifth pipe 631 such that the third mark 659 remains visible while coupled to the adjacent reducing tee 635. Forth mark 661, a diamond shape, is located a set distance away from the end of reducing tee 635. Because fifth pipe 631 and the reducing tee 635 are properly sized to couple together third mark 659 is identical in color to forth mark 661. The applicant used similar hatching in third mark 659 and forth mark 661 to indicate that the color is the same. The hatching does not indicate a difference in materials just a change in color. It should be apparent that the color and shape of first mark 651 is different than forth mark 661 to indicate the difference in diameter between the coupling and the pipe. It should be apparent that the difference between system 201 and system 601 is that system 601 includes the addition of different shapes to aid is designating differences in PVC in addition to using different colors.

Figure 7:
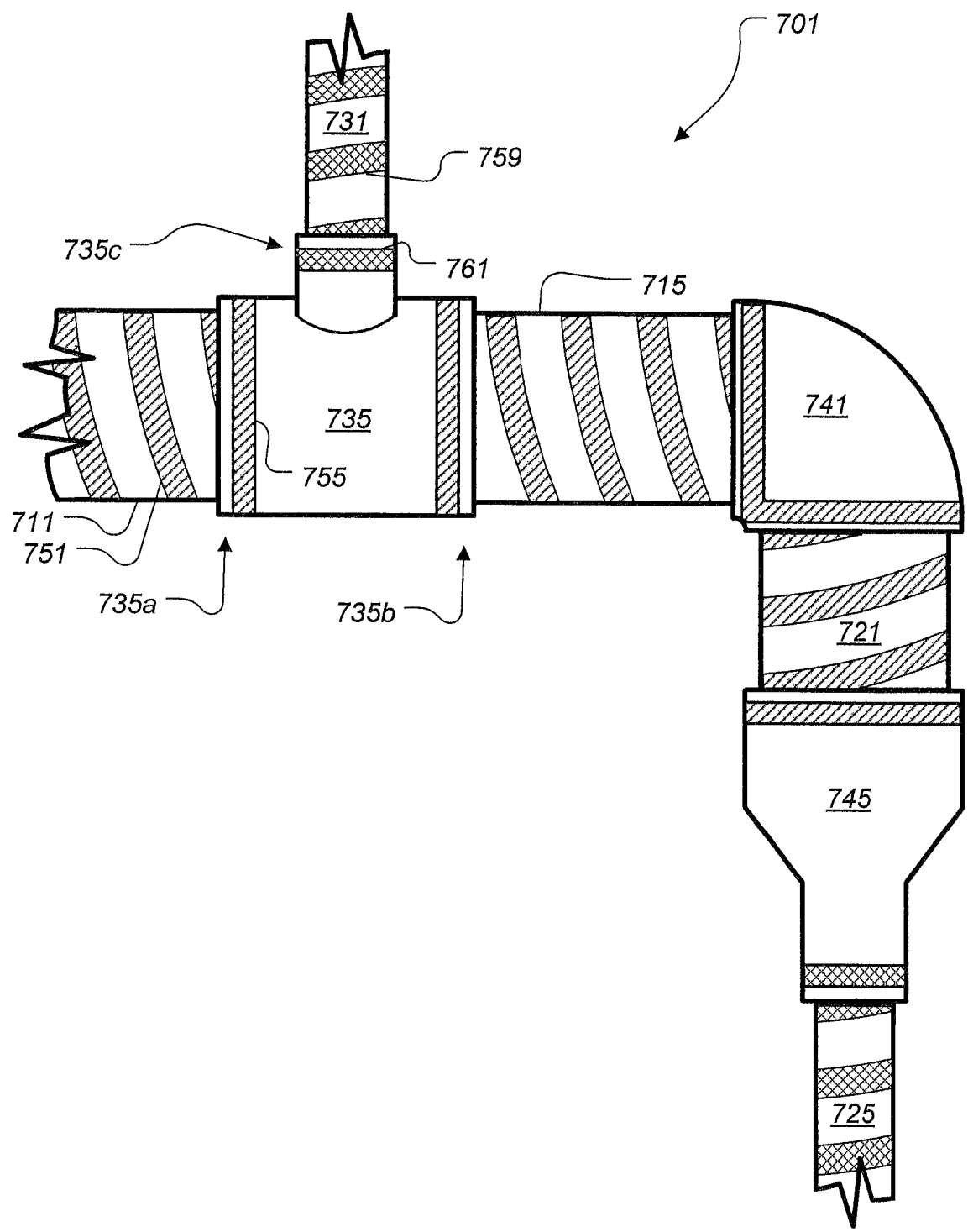
FIG. 7 is a plan view of an embodiment of a color coding system for PVC pipes and couplings according to the present application.

Referring now also to FIG. 7 in the drawings, a preferred embodiment of a color coding system for PVC pipes and couplings according to the present application is illustrated. Plumbing system 701 is a depiction of an improved installation of PVC pipes and PVC fittings. Plumbing system 701 includes a first pipe 711, a second pipe 715, a third pipe 721, a forth pipe 725, and a fifth pipe 731. Connecting first pipe 711 to second pipe 715 is a reducing tee 735 also coupled to fifth pipe 731. Reducing tee 735 has three ports: first port 735a, second port 735b, and third port 735c. First port 735a and 735b have the same diameter, while port 735c has a reduced diameter compared to 735a or 735b. Connecting second pipe 715 to third pipe 721 is an elbow 741. Connecting third pipe 721 to forth pipe 725 is a reducer 745. A plumber or user can visually look at system 701 and verify that the proper sized fittings were used. What allows a user to visually look at system 701 and be able to verify the proper sized fittings in relation to pipes were used are the color codes on the pipes and fittings.

First mark 751 is located on the first pipe 711 such that the first mark 751 remains visible while coupled to the adjacent reducing tee 735 and is candy striped in a curved or helical pattern down the length of the pipe. Second mark 755, a ring around the first port 735a, is located a set distance away from the end of reducing tee 735. Because first pipe 711 and the reducing tee 735 are properly sized to couple together first mark 751 is identical in color to second mark 755. The applicant used similar hatching in first mark 751 and second mark 755 to indicate that the color is the same. The hatching does not indicate a difference in materials just a change in color.

Third mark 759 is located on the fifth pipe 731 such that the third mark 759 remains visible while coupled to the adjacent reducing tee 735 and is candy striped in a curved or helical pattern down the length of the pipe. Forth mark 761, a ring around the third port 735c, is located a set distance away from the end of reducing tee 735. Because fifth pipe 731 and the reducing tee 735 are properly sized to couple together, third mark 759 is identical in color to forth mark 761. The applicant used similar hatching in third mark 759 and forth mark 761 to indicate that the color is the same. The hatching does not indicate a difference in materials just a change in color. It should be apparent that the color of first mark 751 is different than forth mark 761 to indicate the difference in diameter between the coupling and the pipe. It should be apparent that the difference between system 201 and system 701 is that system 701 includes a ring shaped marks around the diameter of the fittings and the spiral stripe down the length of the pipes. Using ring shaped marks and striping the pipes facilitates easy recognition of the fittings and pipes without regards to the relative position of the marks to the user.

Figure 8:
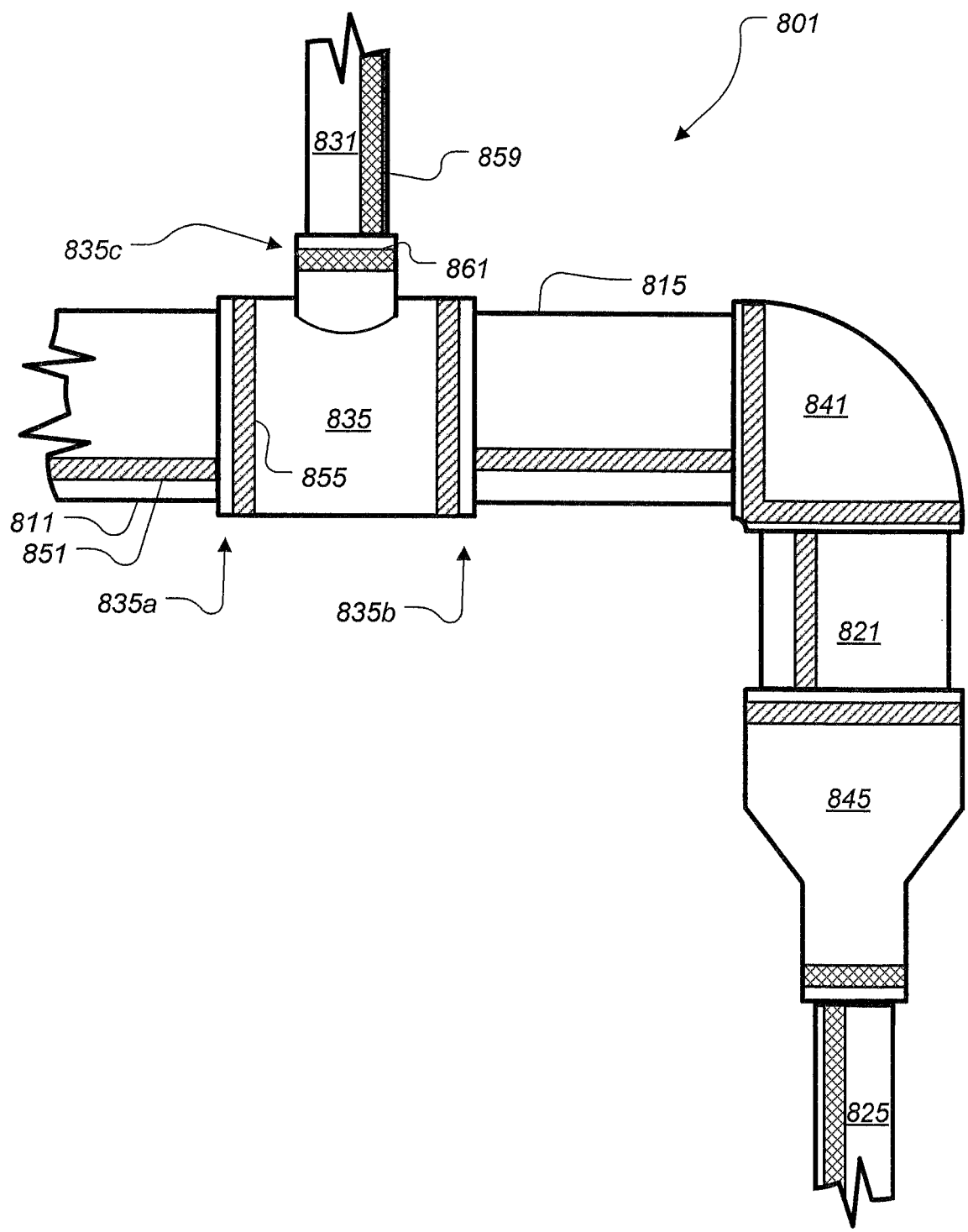
FIG. 8 is a plan view of an embodiment of a color coding system for PVC pipes and couplings according to the present application.

Referring now also to FIG. 8 in the drawings, an alternative embodiment of a color coding system for PVC pipes and couplings according to the present application is illustrated. Plumbing system 801 is a depiction of an improved installation of PVC pipes and PVC fittings. Plumbing system 801 includes a first pipe 811, a second pipe 815, a third pipe 821, a forth pipe 825, and a fifth pipe 831. Connecting first pipe 811 to second pipe 815 is a reducing tee 835 also coupled to fifth pipe 831. Reducing tee 835 has three ports: first port 835a, second port 835b, and third port 835c. First port 835a and 835b have the same diameter, while port 835c has a reduced diameter compared to 835a or 835b. Connecting second pipe 815 to third pipe 821 is an elbow 841. Connecting third pipe 821 to forth pipe 825 is a reducer 845. A plumber or user can visually look at system 801 and verify that the proper sized fittings were used. What allows a user to visually look at system 801 and be able to verify the proper sized fittings in relation to pipes were used are the color codes on the pipes and fittings.

First mark 851 is located on the first pipe 811 such that the first mark 851 remains visible while coupled to the adjacent reducing tee 835 and is striped down the length of the pipe. While first mark 851 is shown as continuous, it should be apparent that first mark 851 could be non-continuous so long as a portion remains readily visible. Second mark 855, a ring around the first port 835a, is located a set distance away from the end of reducing tee 835. Because first pipe 811 and the reducing tee 835 are properly sized to couple together first mark 851 is identical in color to second mark 855. The applicant used similar hatching in first mark 851 and second mark 855 to indicate that the color is the same. The hatching does not indicate a difference in materials just a change in color.

Third mark 859 is located on the fifth pipe 831 such that the third mark 859 remains visible while coupled to the adjacent reducing tee 835 and is striped down the length of the pipe. Forth mark 861, a ring around the third port 835c, is located a set distance away from the end of reducing tee 835. Because fifth pipe 831 and the reducing tee 835 are properly sized to couple together, third mark 859 is identical in color to forth mark 861. The applicant used similar hatching in third mark 859 and forth mark 861 to indicate that the color is the same. The hatching does not indicate a difference in materials just a change in color. It should be apparent that the color of first mark 851 is different than forth mark 861 to indicate the difference in diameter between the coupling and the pipe. It should be apparent that the difference between system 201 and system 801 is that system 801 includes a ring shaped marks around the diameter of the fittings and the linear stripe down the length of the pipes. Using ring shaped marks and striping the pipes facilitates easy recognition of the fittings and pipes without regards to the relative position of the marks to the user.

Figure 9:
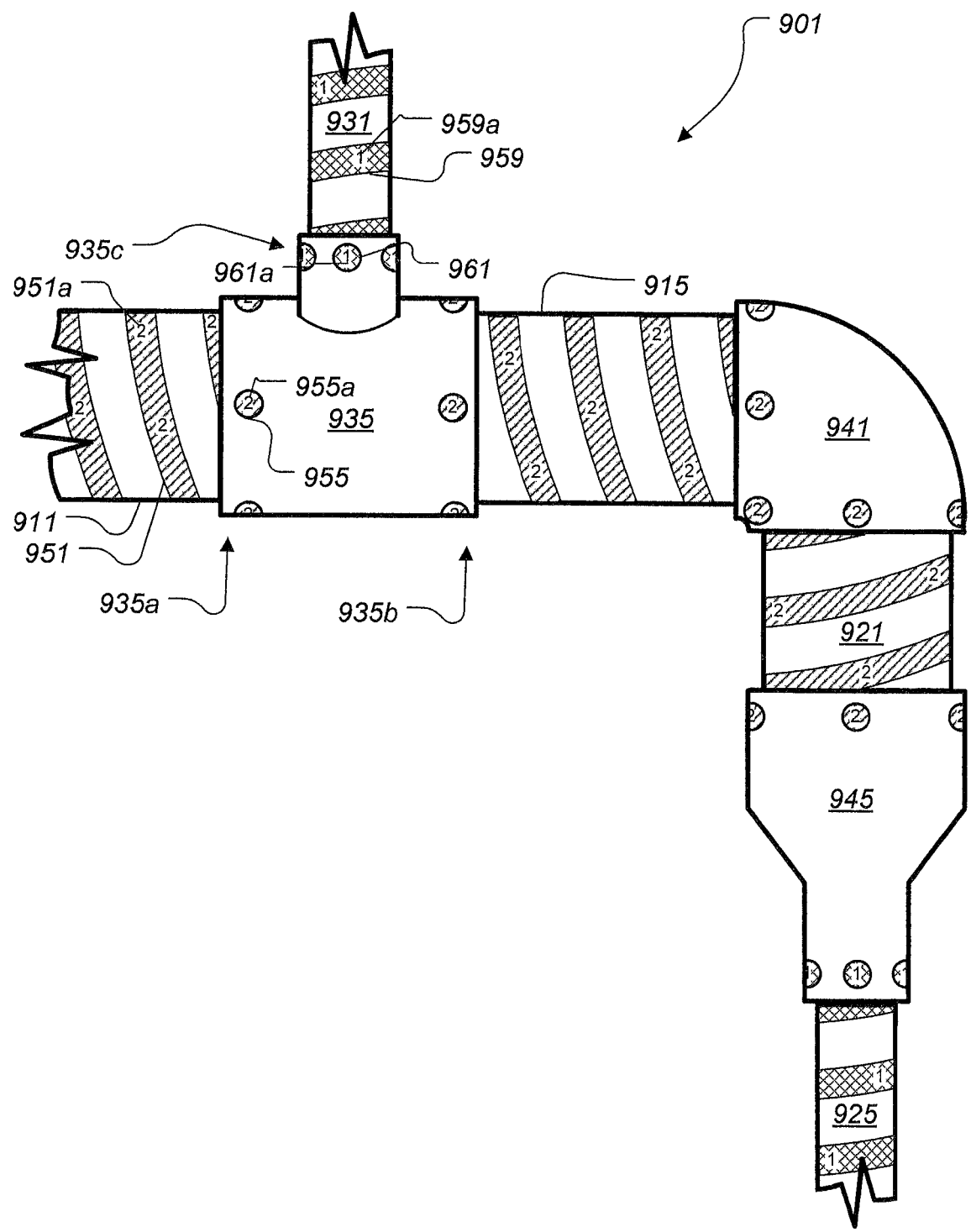
FIG. 9 is a plan view of an embodiment of a color coding system for PVC pipes and couplings according to the present application.

Referring now also to FIG. 9 in the drawings, a preferred embodiment of a color coding system for PVC pipes and couplings according to the present application is illustrated. Plumbing system 901 is a depiction of an improved installation of PVC pipes and PVC fittings. Plumbing system 901 includes a first pipe 911, a second pipe 915, a third pipe 921, a forth pipe 925, and a fifth pipe 931. Connecting first pipe 911 to second pipe 915 is a reducing tee 935 also coupled to fifth pipe 931. Reducing tee 935 has three ports: first port 935a, second port 935b, and third port 935c. First port 935a and 935b have the same diameter, while port 935c has a reduced diameter compared to 935a or 935b. Connecting second pipe 915 to third pipe 921 is an elbow 941. Connecting third pipe 921 to forth pipe 925 is a reducer 945. A plumber or user can visually look at system 901 and verify that the proper sized fittings were used. What allows a user to visually look at system 901 and be able to verify the proper sized fittings in relation to pipes were used are the color codes on the pipes and fittings.

First mark 951 is located on the first pipe 911 such that the first mark 951 remains visible while coupled to the adjacent reducing tee 935 and is candy striped in a curved or helical pattern down the length of the pipe. First mark 951 includes a first indicia 951*a* located inside the first mark 951. As shown first indicia 951*a* is the numeral two however other indicia such as other numbers, letters and words are contemplated by this application. Second mark 955 is located a set distance away from the end of reducing tee 935. Second mark 955 includes a second indicia 955*a* located inside the second mark 955. As shown second indicia 955*a* is the numeral one however other indicia such as other numbers, letters and words are contemplated by this application. Because first pipe 911 and the reducing tee 935 are properly sized to couple together first mark 951 is identical in color to second mark 955. The applicant used similar hatching in first mark 951 and second mark 955 to indicate that the color is the same. The hatching does not indicate a difference in materials just a change in color.

Third mark 959 is located on the fifth pipe 931 such that the third mark 959 remains visible while coupled to the adjacent reducing tee 935 and is candy striped in a curved or helical pattern down the length of the pipe. Third mark 959 includes a third indicia 959*a* located inside the third mark 959. As shown second indicia 955*a* is the numeral one however other indicia such as other numbers, letters and words are contemplated by this application. Forth mark 961 is located a set distance away from the end of reducing tee 935. Forth mark 961 includes a forth indicia 961*a* located inside the forth mark 961. As shown forth indicia 961*a* is the numeral two however other indicia such as other numbers, letters and words are contemplated by this application. Because fifth pipe 931 and the reducing tee 935 are properly sized to couple together, third mark 959 is identical in color to forth mark 961 and includes matching indicia 961*a* and 959*a*. The applicant used similar hatching in third mark 959 and forth mark 961 to indicate that the color is the same. The hatching does not indicate a difference in materials just a change in color. It should be apparent that the color and indicia of first mark 951 is different than forth mark 961 to indicate the difference in diameter between the coupling and the pipe. It should be apparent that the difference between system 201 and system 901 is that system 901 includes a plurality of marks arrayed around the diameter of the fittings, the spiral stripe down the length of the pipes, and the indicia located inside the marks. Arraying the marks and striping the pipes facilitates easy recognition of the fittings and pipes without regards to the relative position of the marks to the user. Preferably the indicia are molded into the plumbing fixtures, however the indicia could be stamped, painted, stickers, textured, and or not painted.

Figure 10:
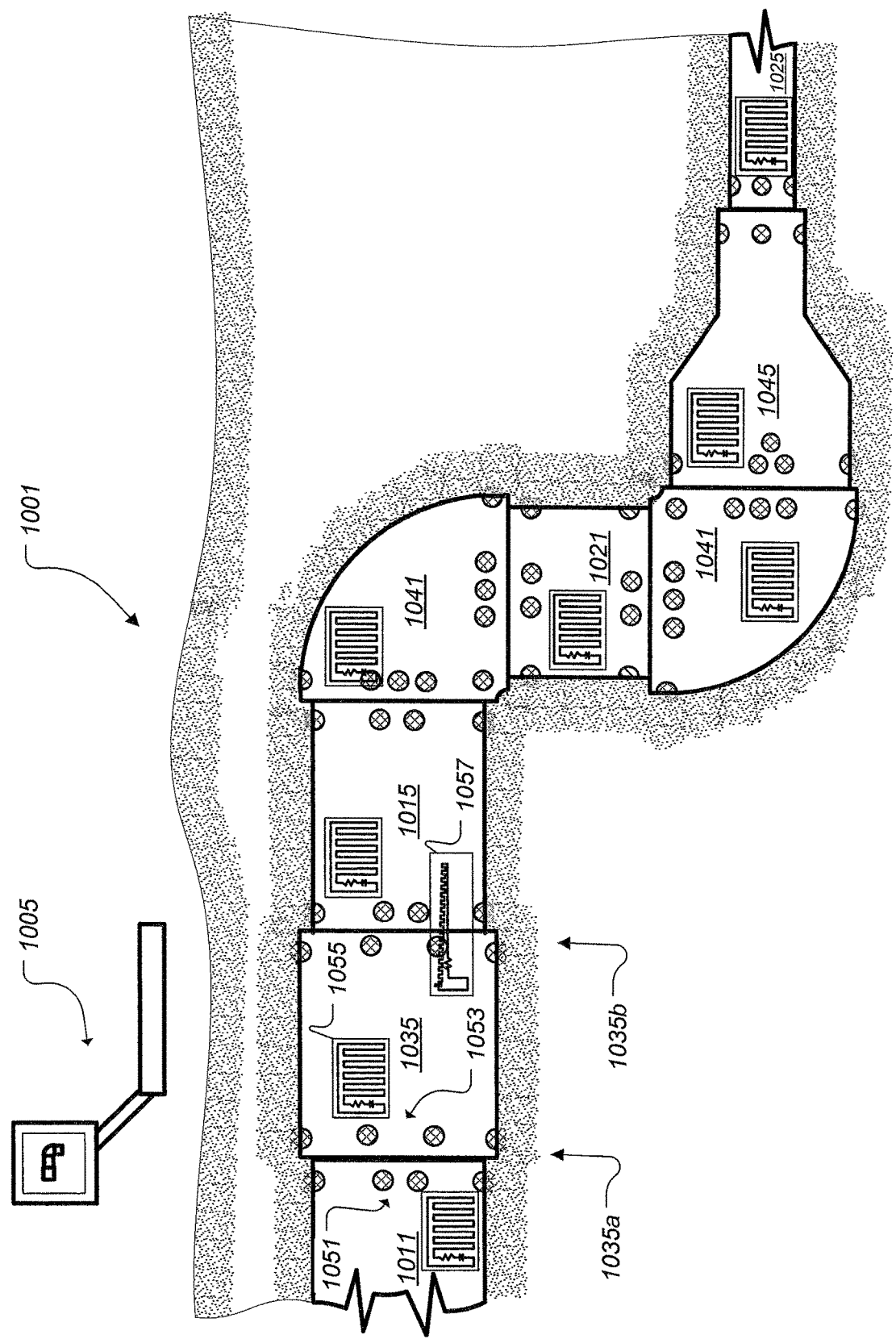
FIG. 10 is a plan view of an embodiment of a color coding system for PVC pipes and couplings according to the present application.

Because the plumbing articles are preferably PVC and will be hidden during installation an improved system to provide installer with a color coded or visual system during installation and a non-visual system after installation is needed. Referring now also to FIG. 10 in the drawings, an embodiment of a color coding system for PVC pipes and couplings according to the present application is illustrated. Plumbing system 1001 is a depiction of an improved installation of PVC pipes and PVC fittings having a variety of devices for determining the configuration of the plumbing system underground without visual access and from a distance. Plumbing system 1001 includes a first pipe 1011, a second pipe 1015, a third pipe 1021, a forth pipe 1025, and a fifth pipe 1031. Connecting first pipe 1011 to second pipe 1015 is a reducing tee 1035 also coupled to fifth pipe 1031. Reducing tee 1035 has three ports: first port 1035*a*, second port 1035*b*, and third port 1035*c*. First port 1035*a* and 1035*b* have the same diameter, while port 1035*c* has a reduced diameter compared to 1035*a* or 1035*b*. Connecting second pipe 1015 to third pipe 1021 is an elbow 1041. Connecting third pipe 1021 to forth pipe 1025 is a reducer 1045. A plumber or user can visually look at system 1001 and verify that the proper sized fittings were used. What allows a user to visually look at system 1001 and be able to verify the proper sized fittings in relation to pipes were used are the color codes on the pipes and fittings. Once the system 1001 is covered up and not visible a user can utilize a hand held detector 1005 to determine the configuration of the system 1001 without removing any dirt and rock over the system. Detector 1005 has a display and an emitter to activate the non-visible tags and an antenna to pick up the signals from the non-visible tags. The display of the detector can be configured to display various configurations. For example the detector may have a database of tags signals correlated to various plumbing articles and then display the plumbing article as the detector is moved along the installed plumbing article.

First mark pair 1051 is located a set distance from the end of the first pipe 1011 such that the first mark 1051 remains visible while coupled to the adjacent reducing tee 1035. Second mark pair 1053 is located a set distance away from the end of reducing tee 1035. Because first pipe 1011 and the reducing tee 1035 are properly sized to couple together first mark pair 1051 is identical in color to second mark pair 1053. However, the distance between the pair of marks are selectively different between the first pair 1051 and the second pair 1053 based upon a characteristic of the plumbing article, such as diameter, thickness, material, age, color, and other pertinent data related to the plumbing article. Since the material of the mark is magnetically reflective and/or ferrous the detector can determine the size of plumbing article by measuring the distance between the pair of marks. Furthermore, the pattern of magnetic marks can be utilized by the detector to determine the plumbing article. For example reducer 1045 utilizes three magnetic marks in the shape of a triangle to indicate size change of the plumbing article. The applicant used similar hatching in first mark 1051 and second mark 1053 to indicate that the color is the same. Furthermore, the shape of magnetic marks can be utilized by the detector to determine the plumbing article as the user could see a square versus a diamond shaped mark on the detector and identify the plumbing article. Additionally, the marks may have a varied density of reflective material such that some marks are more magnetically reflective to indicate different diameters or materials of the plumbing article.

Additional underground markers such as mark 1055 and 1057 can be utilized to allow inspection of plumbing articles still in the ground and covered up. Passive mark 1055 is a radio frequency identification tag "RFID" attached to the plumbing article that is remotely energized and weatherproof suitable for being buried. Mark 1055 provides each plumbing article with a unique identification such that the inspector or user can walk along and analysis the plumbing system to determine an inventory of the plumbing articles in the ground without digging them out. Each plumbing article or each type of plumbing article would have a unique tag. Mark 1057 spans across at least two plumbing articles and facilitates situations where the plumbing article does not require multiple marks for example a prebuilt set of valves. While marks 1055 and mark 1057 are shown enlarged it should be apparent that they actually relatively small as compared to the plumbing article. Furthermore, multiple marks 1055 can be incorporated into a tape to repeatedly identify a longer article such a pipe. System 1001 is comprised of a variety of plumbing articles having marks for visual identification along with marks that don't require visual identification of the mark while the plumbing article is underground or behind a wall. Utilizing multiple visual and non-visual marks provides redundancy in case a mark is damaged or if soil conditions or wall conditions preclude detection of a certain type of mark. For example, if the system is located in iron rich soil the ferrous marks might not work but the RFID marks would.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A system of color coded plumbing articles, the system comprising:
    a first PVC plumbing article comprising:
        a first end having a defined diameter and configuration;
        a first non-removable colored symbol applied to and sealed to an outer surface of the first end, the first colored symbol being selectively based upon the size and configuration of the first end; and
    a second PVC plumbing article comprising:
        a second end having a defined diameter and configuration;
        a second non-removable colored symbol applied to and sealed to an outer surface of the second end, the second colored symbol being selectively based upon the size and configuration of the second end;
    wherein if the first colored symbol matches the second colored symbol, then the first end of first plumbing article can be matingly coupled to the second end of the second plumbing article;
    wherein the first non-removable colored symbol and the second non-removable colored symbol are both visible when the first PVC plumbing article is permanently glued to the second PVC plumbing article.

2. The system according to claim 1, wherein the first plumbing article further comprises:
    another end having a defined diameter and configuration that is different than the defined diameter and configuration of the first end; and
    another non-removable colored symbol located on the outer surface of the other end of the first plumbing article, the other colored symbol being different than the first colored symbol.

3. The system according to claim 1, wherein the first plumbing article further comprises:
    another end having a defined diameter and configuration that is the same as the defined diameter and configuration of the first end;
    the first non-removable colored symbol applied to an outer surface of the other end of the first plumbing article.

4. The system according to claim 1, further comprising:
    at least one other non-removable colored symbol located proximate to the first colored symbol;
    wherein the first colored symbol and the at least one other colored symbol are the same color.

5. The system according to claim 1, wherein the first plumbing article is a pipe; and
    wherein the first colored symbol a stripe along the length of the pipe.

6. The system according to claim 1, wherein the first plumbing article is a coupling; and
    wherein the first colored symbol is disposed around the end of the coupling.

7. The system according to claim 1, wherein the first colored symbol is printed onto the outer surface of the first end.

8. The system according to claim 1, wherein the first colored symbol and the second colored symbol are visible after the first plumbing article has been coupled to the second plumbing article.

9. The system according to claim 1, wherein the first plumbing article is a "T" shaped coupling, each end thereof being marked with a colored symbol indicative of the diameter and end configuration of such end.

10. A system for assembling plumbing articles, comprising:
    a first PVC plumbing article comprising:
        a first end;
        a first inner diameter;
        a first end configuration; and
        a first colored symbol located proximate the end of the first coupling, the first colored symbol being selected based upon the first inner diameter and the first end configuration, and being inseparable from the material of the first coupling; and
    a second PVC plumbing article comprising:
        a second end;
        a second inner diameter
        a second end configuration; and
        a second colored symbol located proximate the end of the second coupling, the second colored symbol being selected based upon the second inner diameter and the second end configuration, and being inseparable from the material of the second coupling;
    wherein the first plumbing article and the second plumbing article are different;
    wherein the first colored symbol and the second colored symbol are the same; and
    wherein the first plumbing article and the second plumbing article are sized and have the same end configurations, so as to be matingly coupled together; and
    wherein the first colored symbol and the second colored symbol are both visible after the first PVC plumbing article is glued to the second PVC plumbing article.

11. The system according to claim 10, wherein the first coupling further comprises:
    a plurality of colored symbols located proximate the first end and being arranged in an array around the first end.

12. The system according to claim 11, wherein the plurality of colored symbols are arranged into a selected pattern.

13. The system according to claim 10, wherein the first plumbing article has at least two ends with different end configurations, with end having a different colored symbol.

14. The system according to claim 10, wherein the shapes of the colored symbols are etched into the outer surfaces of the plumbing articles.

15. The system according to claim 10, wherein the shapes of the colored symbols are molded into the outer surfaces of the plumbing articles.

16. The system according to claim 10, wherein some of the plumbing articles are made of PVC and others of the plumbing articles are made of a metallic material.

\* \* \* \* \*